(12) United States Patent
Gorman et al.

(10) Patent No.: US 7,669,889 B1
(45) Date of Patent: Mar. 2, 2010

(54) AIR BAG CHUTE ATTACHMENT

(75) Inventors: David J Gorman, Royal Oak, MI (US); Scott D. Thomas, Novi, MI (US); Nancy C. Evans, Clinton Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/335,726

(22) Filed: Dec. 16, 2008

(51) Int. Cl.
*B60R 21/16* (2006.01)
(52) U.S. Cl. .................................... 280/730.2
(58) Field of Classification Search .............. 280/730.2, 280/728.3
See application file for complete search history.

(56) References Cited

U.S. PATENT DOCUMENTS

| | | | |
|---|---|---|---|
| 5,762,363 A | 6/1998 | Brown et al. | |
| 5,863,063 A | 1/1999 | Harrell | |
| 5,927,749 A | 7/1999 | Homier | |
| 5,967,603 A | 10/1999 | Genders et al. | |
| 6,045,151 A | 4/2000 | Wu | |
| 7,322,597 B2 * | 1/2008 | Tracht | 280/728.3 |
| 7,458,603 B2 * | 12/2008 | Buono et al. | 280/728.2 |
| 2007/0085308 A1 * | 4/2007 | Tracht et al. | 280/730.2 |

* cited by examiner

*Primary Examiner*—Faye M. Fleming

(57) ABSTRACT

An air bag chute directs the deployment of an air bag from an air bag housing mounted on a seat frame through a separable seam sewn between inboard and outboard seat cover panels. An air bag housing is box shaped with a base wall mounted on the seat frame and rear, front, and end walls extending from the base wall and a cover wall. An inboard chute panel and an outboard chute panel each have inner ends attached to the air bag housing and outer ends attached to the inboard and outboard seat cover panels adjacent to the separable seam. The attachment of the inner ends of the inboard and outboard chutes to the air bag housing is provided on the walls of the housing with the inner ends spaced from one another.

20 Claims, 5 Drawing Sheets

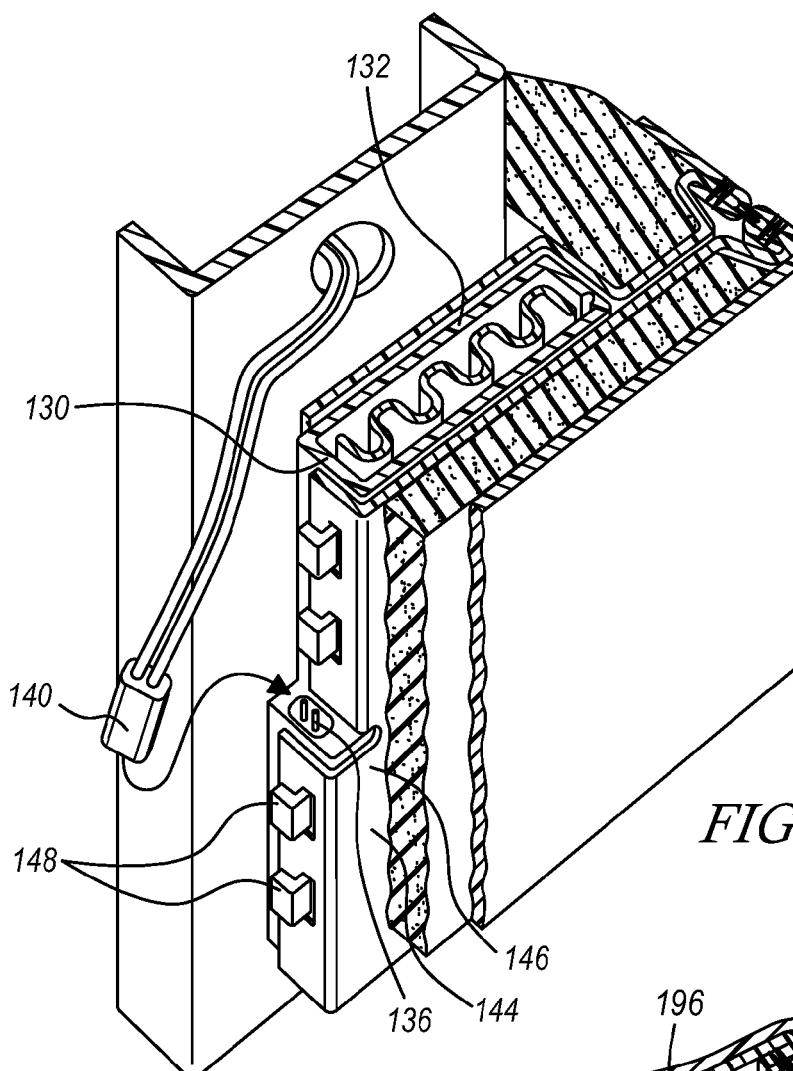
FIG. 6
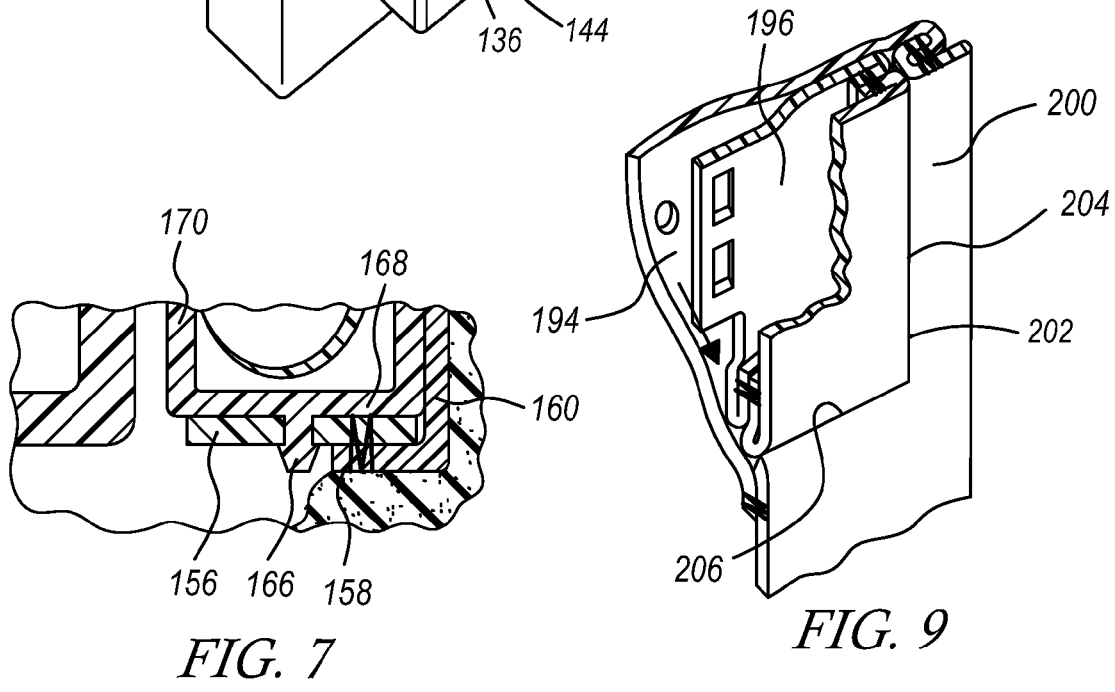
FIG. 7
FIG. 9

AIR BAG CHUTE ATTACHMENT

FIELD OF THE INVENTION

The present invention relates to an air bag chute for guiding the deployment of an air bag from a seat back and more particularly provides for improved attachment of the chute to the air bag housing.

BACKGROUND OF THE INVENTION

It is well known in motor vehicles to mount an air bag in a seat back for deployment through a seam in the seat back trim material so that the inflated air bag provides for restraint of an occupant.

It is also known to provide a chute comprised of flexible but generally un-stretchable material that wraps around the air bag housing and extends to both sides of the separable seam in the vehicle seat covering so that the chute material will convey the inflating air bag to the seam in a timely and efficient manner.

It would be desirable to provide improvements in the provision of air bag chutes within the seat back and more particularly provide for improved attachment of the chute to the air bag housing.

SUMMARY OF THE INVENTION

An air bag chute apparatus directs the deployment of an air bag from an air bag housing mounted on a seat frame and hidden in a seat cushion through a separable seam sewn between inboard and outboard seat cover panels. An air bag housing is box shaped with a base wall mounted on the seat frame and rear, front, and end walls extending from the base wall and a cover wall defining an opening through which the air bag deploys upon inflation thereof. An inboard chute panel has an inner end attached to the air bag housing and an outer end attached to the inboard seat cover panel adjacent the seam. An outboard chute panel has an inner end attached to the air bag housing and an outer end attached to the outboard seat cover panel adjacent to the seam. The attachment of the inner ends of the inboard and outboard chutes to the air bag housing is provided on the walls of the housing with the inner ends spaced from one another.

Further applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a section view taken in the direction of arrows 2-2 of FIG. 1.

FIG. 6 is a perspective view of another embodiment of the invention.

FIG. 7 is a section view showing another embodiment of the invention.

FIG. 9 is a perspective view similar to FIG. 3 showing another embodiment of the invention.

DETAILED DESCRIPTION OF THE EXEMPLARY EMBODIMENTS

The following description of certain exemplary embodiments is merely exemplary in nature and is not intended to limit the invention, its application, or uses.

Figure 1:
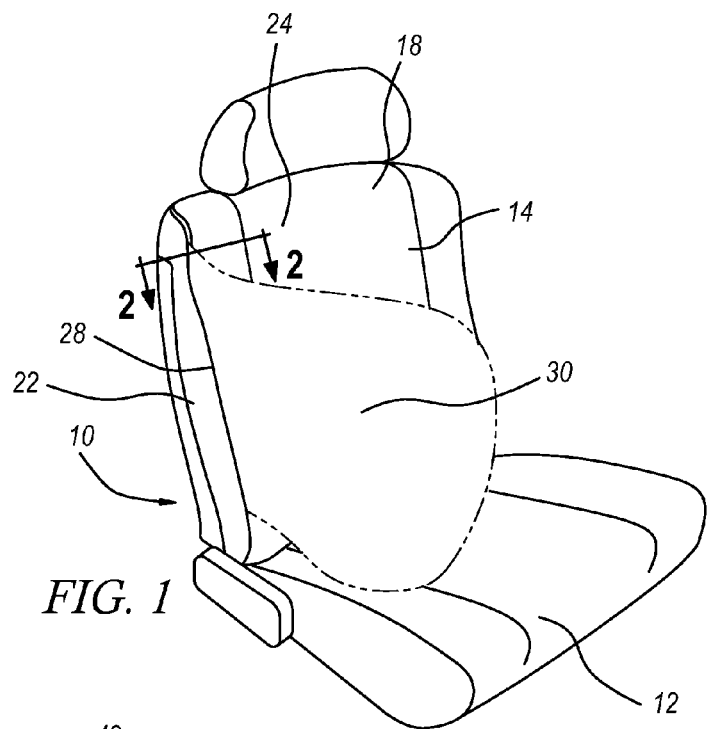
FIG. 1 is a perspective view of a vehicle seat back showing the inflated air bag in phantom lines.

Referring to FIG. 1, a vehicle seat is indicated generally at 10 and includes a seat bottom 12 and a seat back 14. The seat back 14 is comprised generally of a seat back frame, to be discussed hereinafter, a foam cushion covering the frame, and a seat cover 18 which covers the foam. As shown in FIG. 1, the seat cover 18 for the seat back 14 includes at least a side panel 22 and a front panel 24 that are joined together at a separable, breakaway, or tear seam 28 that will separate to permit the deployment of an air bag. The inflated air bag is shown in phantom lines at 30 in FIG. 1.

Referring to FIG. 2, the internal construction of the seat back 14 is shown. In general, the seat back construction includes a seat back frame 34, an inboard foam cushion portion 36, an optional outboard foam cushion portion 38, an inboard seat cover portion 42, an outboard seat cover portion 44, and an air bag assembly, generally indicated at 48.

The air bag assembly 48 includes a housing 52, an inflator 54, and a folded up air bag 56. The air bag housing 52 is a box shaped molded plastic construction including a base wall 58, a rear wall 60, a front or forward wall 62, a bottom end wall 64 and a top end wall, not shown. Alternatively, a portion of the housing 52 may also be made of metal. The air bag housing 52 also includes a cover wall 68 which is integrally molded with the rear wall 60 at a living hinge 72. The cover wall 68 is connected to the forward wall 62 by a breakaway seam or joint 76 or other latching arrangement. Alternatively, the breakaway seam can be located on a different wall. As seen in FIG. 2, the air bag inflator 54 has mounting studs, one of which is shown at 78, that extend through a mounting hole in the seat back frame 34 and receive a nut 80 so that the inflator 54 attaches the air bag housing 52 to the seat back frame 34.

Figure 3:
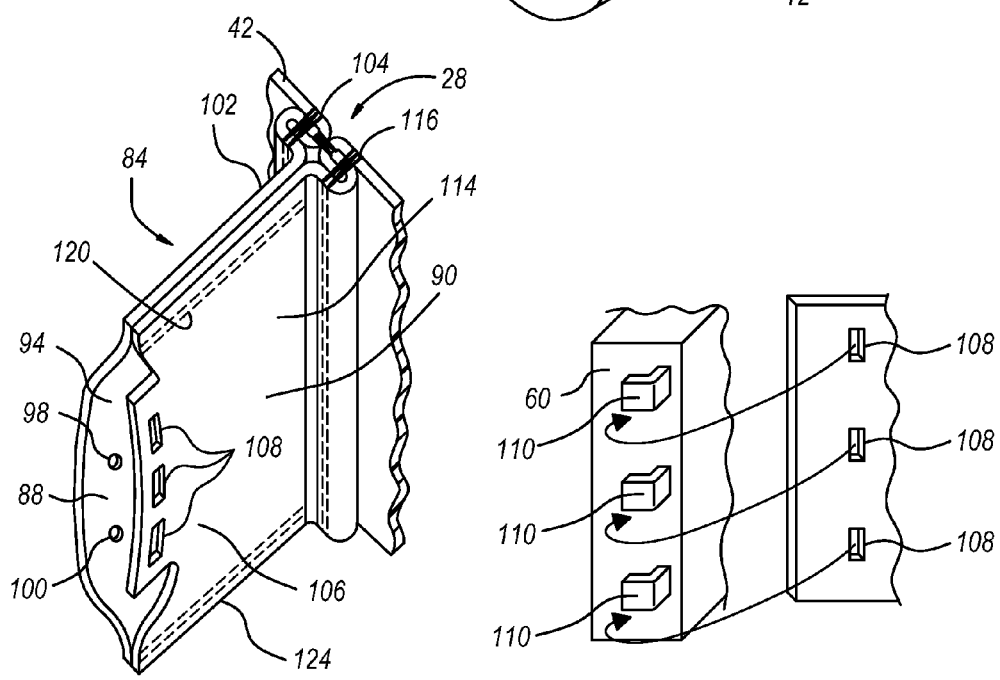
FIG. 3 is a perspective view of the air bag chute for guiding the deployment of the inflating air bag.
Figure 4:
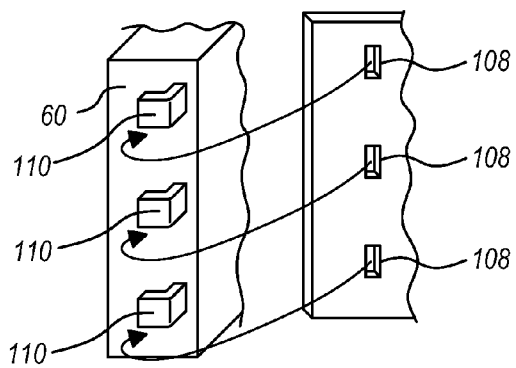
FIG. 4 is an enlargement showing an attachment of the air bag chute to the air bag housing.

Referring now to FIGS. 2 and 3, an air bag chute assembly, generally indicated at 84, is provided to guide the deployment of the air bag 56 from the air bag housing 52 outwardly to the deployed position of FIG. 1. The air bag chute 84 includes an inboard chute panel 88 and an outboard chute panel 90, each made of a separate piece of flexible material, such as seat covering material, air bag material, or other flexible woven or non-woven material. The inboard chute panel 88 has a rear most end portion 94 that extends between the base wall 58 of the housing 52 and the seat back frame 34 and has a pair of holes 98 and 100 that receive the mounting studs 78 of the air bag inflator 54 so that the inboard chute panel 88 is effectively attached to the housing 52 of the air bag assembly 48 by the mounting studs 78. The forward most end portion 102 of the inboard chute panel 88 is sewn to the inboard seat cover 42 adjacent to the separable seam 28 by threads 104. The outboard chute panel 90 of the chute assembly 84 has a rear most end portion 106 having a plurality of slots 108 therein which hook a plurality of hook brackets 110 that are molded integrally with the rear wall 60 of the air bag housing 52. These hook brackets 110 and the corresponding plurality of slots 108 in the chute assembly 84 are best seen in FIG. 4. As seen in FIG. 2, the outboard chute panel 90 extends from the air bag housing 52 forwardly to the separable seam 28 where a forward most end portion 114 of the outboard chute panel 90 is sewn into the separable seam 28 by threads 116. Separable seams can also be sewn between the forward most end portions 102 and 114, in addition to the separable seam 28.

Referring again to FIG. 3, it is seen that the inboard chute panel 88 and the outboard chute panel 90 are attached together by a row of stitches at 120 that is sewn between the top edge portions of the chutes. Furthermore, as shown in FIG. 3, the bottom edge portions of the chute panels are sewn together by a row of stitches at 124. Alternatively, the row of stitches 120 and/or 124 can be omitted, or, the row of stitches 120 and/or 124 can be a breakaway seam that will open when the air bag 56 inflates. Thus, the rows of stitches 120 and 124 can be either breakable or unbreakable.

Figure 5:
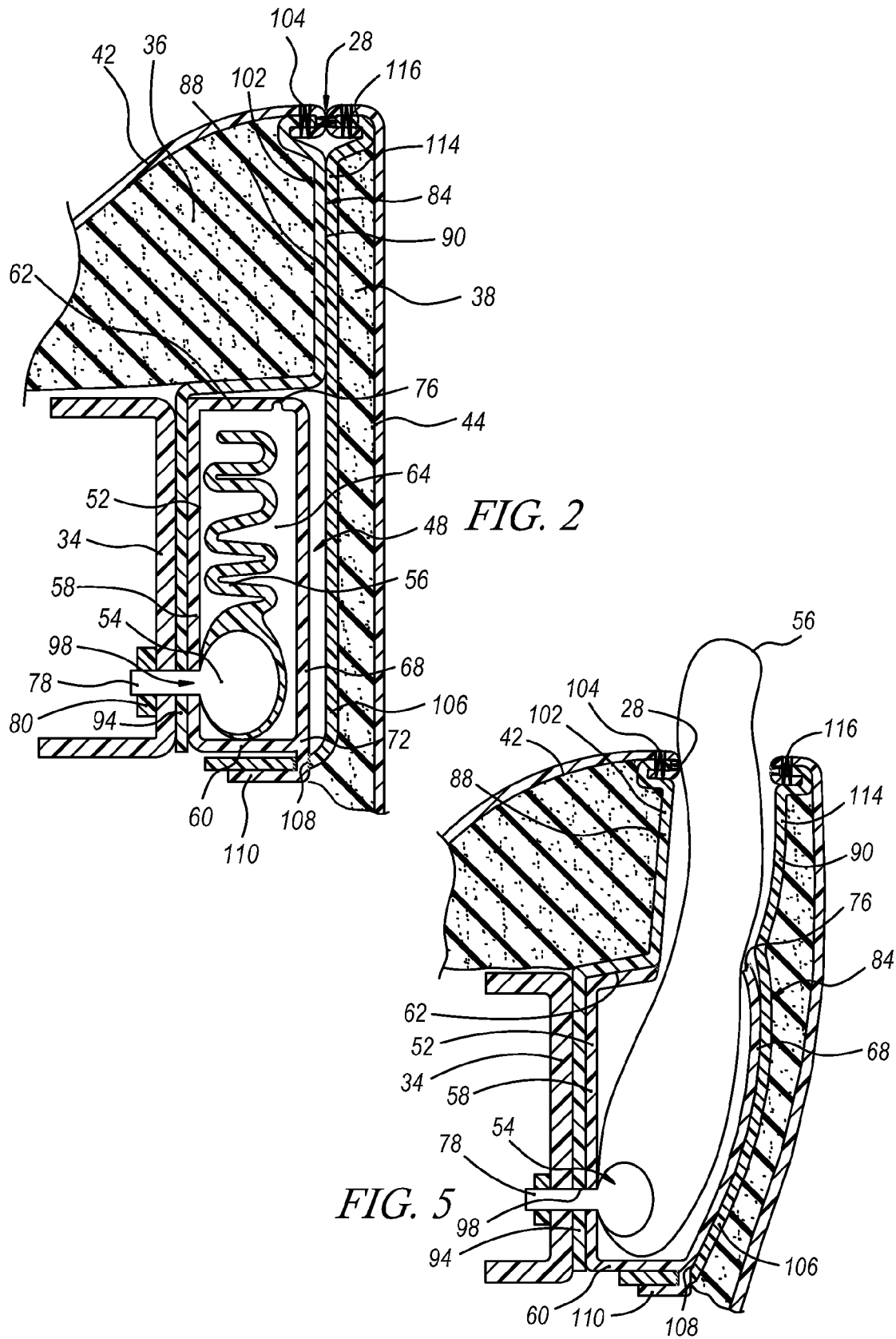
FIG. 5 is a section view similar to FIG. 2 but showing the air bag during deployment thereof through the chute.

Referring now to FIG. 5, it is seen that the air bag 56 has been inflated by an activation of the inflator 54 and that the inflating air bag 56 has forced open the cover wall 68 of the air bag housing 52 by fracturing the breakaway seam 76 between the forward wall 62 and cover wall 68 of the air bag housing 52. In addition, FIG. 5 shows that the chute assembly 84 has guided and defined the deployment path of the air bag 56 so that the air bag 56 has forced apart the inner and outer chute panels 88 and 90, thereby stressing the breakaway seam 28 to separate the seam 28 and enable the deployment of the air bag 56.

Referring again to FIG. 3, it will be understood that the stitches 120 at the top of the air bag chute and 124 at the bottom of the air bag chute can be omitted. Or, alternatively, the row of stitches 120 and/or 124 can be either a tear way seam which will allow the air bag to break out of the chute if desired or a non-tear away seam that would guide the air bag 56 to the tear seam 28.

Referring again to FIGS. 2 and 3, it will be understood that the air bag chute attachment arrangement shown herein enables the efficient assembly of the vehicle seat. In particular, the seat cover 18 is sewn with the air bag chute 84 attached thereto as shown in FIG. 3. The air bag assembly 48 is fitted into the open rear end of the chute assembly 84 that is defined between the rear most end 94 of the inboard chute panel 88 and the rear most end 106 of the outboard chute panel 90. The studs 78 can then be inserted through the holes 98 and 100 in the seat back frame 34 and the nuts 80 are applied to the studs 78 to effectively attach the air bag housing 52 to the seat. Then, the outboard chute panel 90 can be stretched over the rear wall 60 of the air bag housing 52 and the apertures 108 thereof are hooked over the hook brackets 110 of the rear wall 60 of the air bag housing 52.

FIG. 6 is a perspective view of an embodiment of the air bag chute in which it is seen that a rearward wall 130 of an air bag housing 132 is offset along its length to enable an electrical connector 136 to be mounted on the offset in the rearward wall 130 for easy access by a mating electrical connector 140 connected to the control circuitry for the air bag. As seen in FIG. 6, a rearward end 144 of an outboard chute panel 146 reaches around onto the rearward wall 130 of the air bag housing 132 and hooks over attachment brackets 148 without interfering with the electrical connectors 136 and 140. The connection between the electrical connectors 136 and 140 can be made either prior to or after the outboard chute panel 146 is hooked over the brackets 148.

Then, as shown in FIG. 6 the electrical connector 140 can be readily installed onto the electrical connector 136 between the gap formed between the inboard chute panel 88 and the outboard chute panel 90. The electrical connector 140 can also be installed into the electrical connector 136 either before or after one or both of the inboard chute panel 88 and the outboard chute panel 90 are installed to the air bag assembly 48.

It will be understood that the outboard chute 90 can be attached to the air bag housing wall 132 using any of the prior known attachment mechanisms for attaching a flexible sheet to a vehicle structure. For example, FIG. 7 shows that an apertured plastic strip 156 has been sewn onto a rearward end 158 of an outboard chute panel 160 and the apertures thereof will snap over headed protrusions 166 that are integrally molded to a rear wall 168 of air bag housing 170. Any of the various attachment arrangements known in the prior art can be employed including, for example, heat staking, adhesives, Velcro, and various J-hook type constructions or other snap together construction known for attaching fabric to a vehicle seat. Furthermore, in such attachment arrangements the male and female elements can be reversed, for example in FIG. 6, the hook portion can be provided on the chute via the addition of a hook strap sewn to the chute material, and the slots for receiving the hook portions can be provided on the rearward wall 130 of the air bag housing 132.

Figure 8:
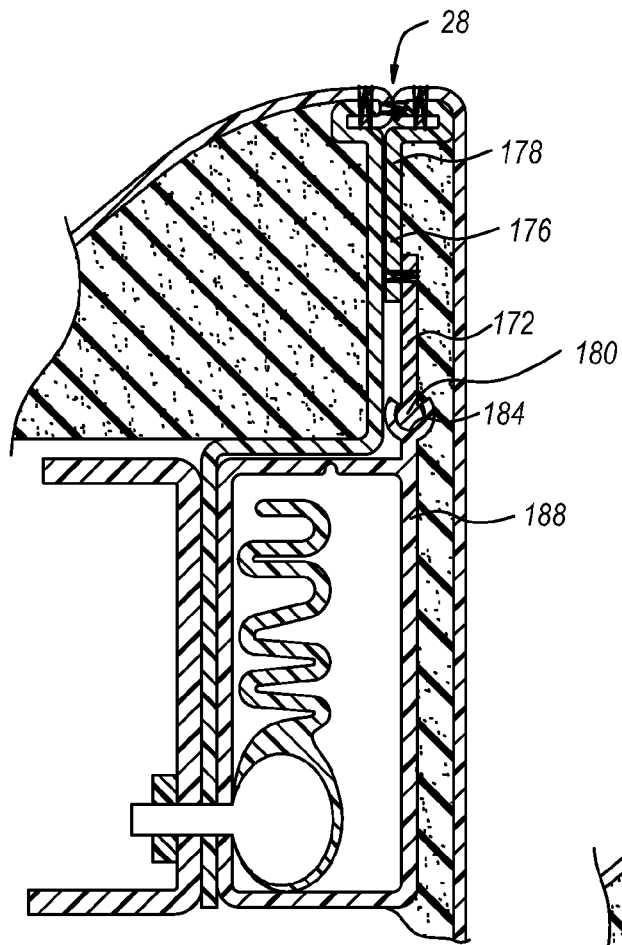
FIG. 8 is a section view showing another embodiment of the invention.

FIG. 8 shows another embodiment of the invention and in particular an alternative mounting of an outer chute panel on an air bag housing. In particular, shown in FIG. 8 a plastic strip 172 is sewn to a rearward end 176 of an outboard chute panel 178. The plastic strip 172 has an enlarged bulbous end 180 that is captured in a channel 184 that is integrally molded onto the end of a cover wall 188 of the air bag housing. Accordingly, when the cover wall 188 is pivoted outwardly by a deploying air bag, the outboard chute panel 178 will remain attached to the cover wall 188 and swing in the outboard direction with the cover wall 188 and direct the deploying air bag to the separable seam 28. If the outboard chute panel 178 is made of a material like plastic, the bulbous end 180 can be integrally formed on the chute panel 178.

FIG. 9 shows another optional construction where an inboard chute 194 and an outboard chute 196 are sewn to a seat cover material 200 that has a tear seam 202 including a vertical extending tear seam portion 204 and a horizontal tear seam portion 206. It will be understood that the horizontal tear seam portion 206 in FIG. 9 is at the bottom of the air bag assembly, but can be at the top of the air bag assembly.

Figure 10:
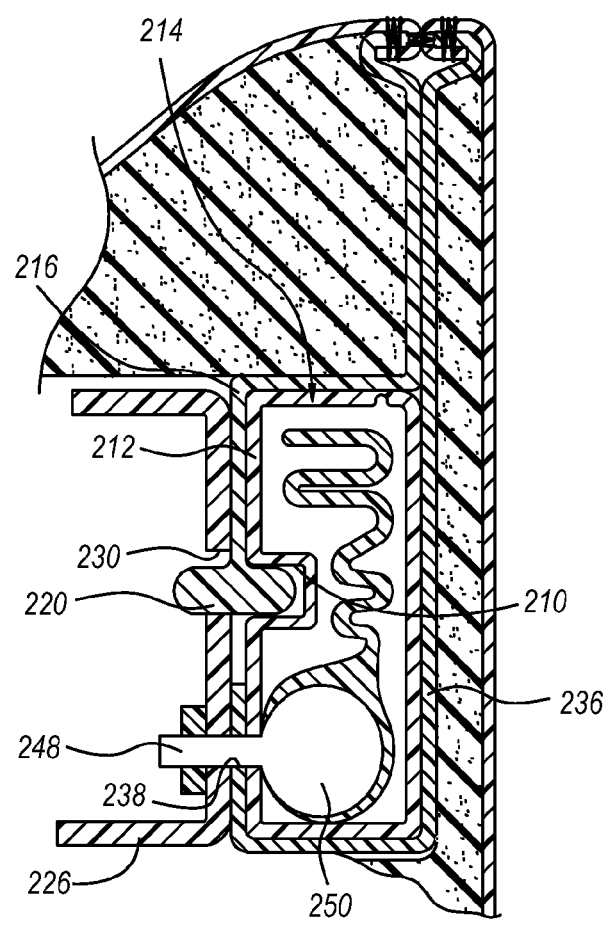
FIG. 10 a section view showing another embodiment of the invention.

FIG. 10 shows another embodiment where a depression or hole 210 is formed in a base wall 212 of air bag housing 214. The end of the inboard chute 216 has an enlarged portion 220 that is captured in the base wall depression or hole 210 when the air bag assembly is attached to the seat frame 226. The enlarged portion 220 is shown as an enlarged bulbous end that is formed integral with the inboard chute 216, but may instead be provided by a separate plastic strip that would be sewn to the end of the inboard chute 216. A corresponding depression or hole 230 is provided in seat frame 232 to receive the enlarged portion 220. A snap feature may also be provided in either the air bag assembly or the seat frame to assist this engagement and the assembly process. As an alternative, with a bulbous end of a different shape, the depression or hole could be located on only the air bag housing or the seat frame. An outboard chute 236 has a hole 238 that receives a stud 248 of air bag inflator 250 to attach the outboard chute 236 to the air bag assembly 224. Thus, FIG. 10 is one illustrative example of an attachment of the inboard chute to the air bag assembly in a location other than the studs. All of the various attachment means shown herein as examples of the attachment of the outer chute to the air bag assembly can also be applied to attaching the inboard chute on either the base wall or the forward wall.

Figure 11:
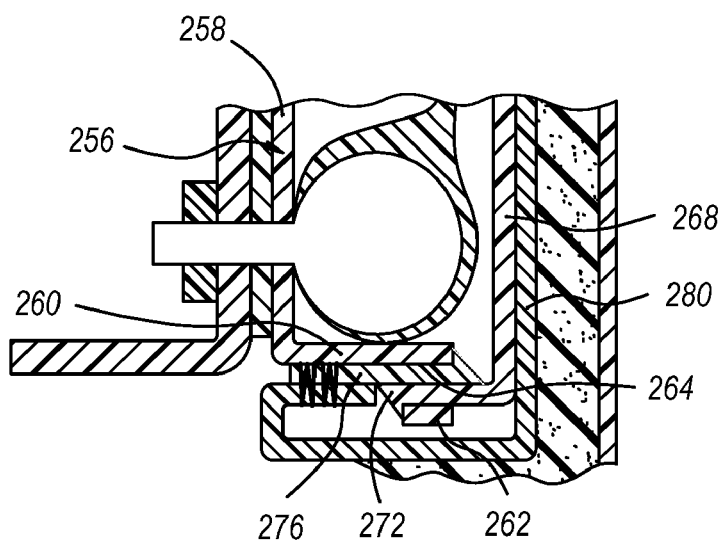
FIG. 11 is a section view showing another embodiment of the invention.

FIG. 11 shows another attachment arrangement for the chute assembly. In this case the air bag housing 256 has plastic walls that snap together. In particular, base wall 258 and rearward wall 260 are molded integrally and the rearward wall 260 has a retainer tab 262 that defines a slot 264. A cover wall 268 has a snap tab 272 that reaches into the slot 264. A plastic strip 276 is sewn to the end of an outboard chute 280 and also reaches into the slot 264, so that both the outboard chute 280 and the cover wall 268 are effectively attached to the rearward wall 260 by entrapment in the slot 264 defined between the rearward wall 260 and the retainer tab 262.

Figure 12:
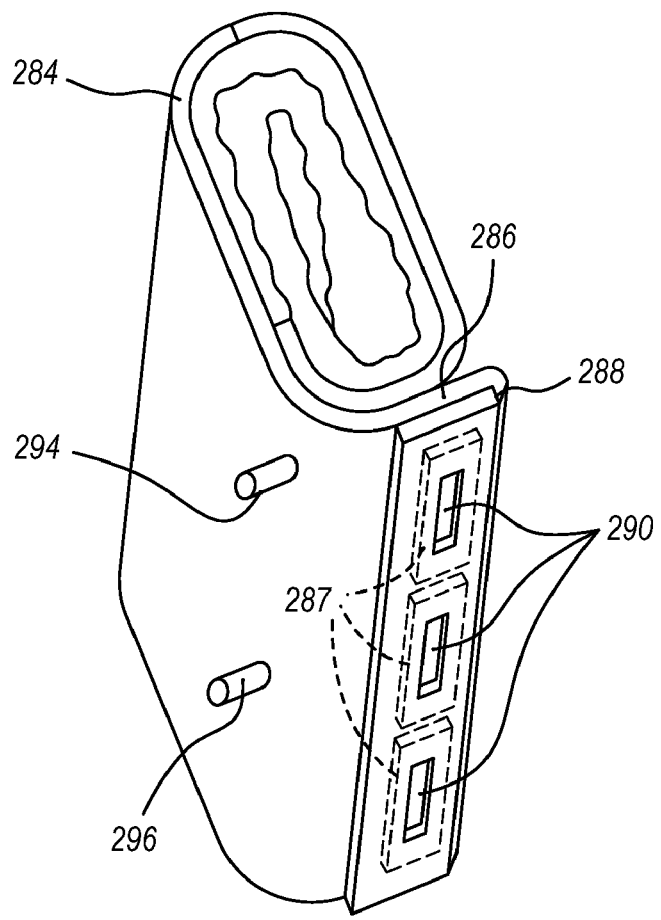
FIG. 12 is a perspective view showing another embodiment of the invention in which the air bag housing is a flexible material.

FIG. 12 is an example of an air bag housing that is made of a flexible fabric rather than the more rigid molded plastic housing shown in the other examples. In particular, air bag housing 284 includes a rearward wall 286 in the form of a flap of material that has a plurality of holes 287. A reinforcing strip of plastic 288 is bonded to the flap of the rearward wall 286 and has holes 290. The outboard chute, not shown, will have hook portions that hook into the holes 270 and 290 to attach the outboard chute to the rearward wall 286 of the air bag housing 284. The inboard chute, also not shown in FIG. 12, will have holes that receive studs 294 and 296.

Thus, the invention provides a new and improved chute assembly for deploying an air bag from a vehicle seat. It will be understood and appreciated that the drawings herein show just one example of the separable seam provided between the inboard and outboard seat trim panel portions. Other seam arrangements, such as a French seam or a seam with a supplemental tape are well known in the air bag and seat parts and may be employed as an alternative to the particular seam arrangement that is shown in the drawings hereof.

What is claimed is:

1. An air bag chute apparatus for directing the deployment of an air bag from an air bag housing mounted on a seat frame and hidden in a seat cushion for deployment through a separable seam sewn between inboard and outboard seat cover panels comprising:
    an air bag housing being generally box shaped with a base wall mounted on the seat frame and rear front, and end walls extending from the base wall and a cover wall and wherein at least one wall is mounted on the seat frame and at least one wall defines an opening through which the air bag deploys upon inflation thereof;
    an inboard chute panel that has an inner end attached to the air bag housing and an outer end attached to the inboard seat cover panel adjacent the seam;
    an outboard chute panel that has an inner end attached to the air bag housing and an outer end attached to the outboard seat cover panel adjacent to the seam;
    said attachment of the inner ends of the inboard ends of the inboard and outboard chutes to the air bag housing being on the walls of the housing with the inner ends spaced from one another, and the inboard chute panel having the inner end captured between the housing base wall and the seat frame and attached thereto by an air bag assembly stud, and the outboard chute having its inner end attached to a different wall of the housing that is not bolted to the seat frame.

2. An air bag chute apparatus for directing the deployment of an air bag from an air bag housing mounted on a seat frame and hidden in a seat cushion for deployment through a separable seam sewn between inboard and outboard seat cover panels comprising:
    an air bag housing being generally box shaped with a base wall mounted on the seat frame and rear front, and end walls extending from the base wall and a cover wall and wherein at least one wall is mounted on the seat frame and at least one wall defines an opening through which the air bag deploys upon inflation thereof;
    an inboard chute panel that has an inner end attached to the air bag housing and an outer end attached to the inboard seat cover panel adjacent the seam;
    an outboard chute panel that has an inner end attached to the air bag housing and an outer end attached to the outboard seat cover panel adjacent to the seam;
    said attachment of the inner ends of the inboard ends of the inboard and outboard chutes to the air bag housing being on the walls of the housing with the inner ends spaced from one another, and at least one of the inboard chute panel and the outboard chute panel attaches around the air bag housing studs and is captured between the seat frame and the air bag housing.

3. The air bag chute apparatus of claim 2 where the other one of the inboard chute panel and the outboard chute panel attaches to hooks provided on the air bag housing.

4. The air bag chute apparatus of claim 2 where the other one of the inboard chute panel and the outboard chute panel has an attached strip that is utilized when making its attachment to the air bag housing.

5. The air bag chute apparatus of claim 2 where the other one of the inboard chute panel and the outboard chute panel snaps into the air bag housing.

6. The air bag chute apparatus of claim 2 where the other one of the inboard chute panel and the outboard chute panel nests within a depression on the air bag housing.

7. The air bag chute apparatus of claim 2 where the other one of the inboard chute panel and the outboard chute panel are attached to the air bag housing by protrusions.

8. The air bag chute apparatus of claim 2 where at least the other one of the inboard chute panel and the outboard chute panel are attached the housing by a bulbous end on one of the panel and the housing wall and a channel provided on the other of the panel and housing wall.

9. The air bag chute apparatus of claim 2 where the inboard chute panel and the outboard chute panel each have a top and a bottom and the panels are sewn together at one of the top and the bottom.

10. The air bag chute apparatus of claim 9 where the sewing is a tear seam.

11. The air bag chute apparatus of claim 9 where the sewing is a permanent seam.

12. The air bag chute apparatus of claim 9 where the sewing location is also near a second tear seam that enables the air bag to deploy through this location out of the seat cover between adjacent cover pieces when the second tear seam is fractured during deployment.

13. The air bag chute apparatus of claim 2 where an electrical connector attachment is made in the space between the inboard chute panel and the outboard chute panel.

14. The air bag chute apparatus of claim 2 where an electrical connector attachment is made in a space between panels of one of the inboard chute panel and the outboard chute panel.

15. An air bag chute apparatus for directing the deployment of an air bag from an air bag housing mounted on a seat frame and hidden in a seat cushion for deployment through a separable seam sewn between inboard and outboard seat cover panels comprising:

an air bag housing being generally box shaped with a base wall and rear, front, and end walls extending from the base wall where at least one wall is mounted to the seat frame and at least one wall defines an opening through which the air bag deploys upon inflation thereof;

an inboard chute panel that has an inner end attached to the air bag housing and an outer end attached to the inboard seat cover panel adjacent the seam;

an outboard chute panel that has an inner end attached to the air bag housing and an outer end attached to the outboard seat cover panel adjacent to the seam;

said attachment of the inner ends of the inboard ends of the inboard and outboard chutes to the air bag housing being on different walls of the housing so that the inner ends are spaced from one another, said inboard chute panel having the inner end attached to the wall of the housing that is bolted to seat frame by capturing the inner end of the inboard chute between the housing and the seat frame and the inner end of the outboard chute is attached to a different wall of the housing that is not bolted to the seat frame, said outboard chute panel attaching to hooks provided on the air bag housing.

16. The air bag chute apparatus of claim 15 where the inboard chute panel and the outboard chute panel each have a top and a bottom and the panels are sewn together at one of the top and the bottom.

17. The air bag chute apparatus of claim 16 where the sewing is a tear seam.

18. The air bag chute apparatus of claim 16 where the sewing is a permanent seam.

19. The air bag chute apparatus of claim 16 where the sewing location is also near a second tear seam that enables the air bag to deploy through this location out of the seat cover between adjacent cover pieces when the second tear seam is fractured during deployment.

20. The air bag chute apparatus of claim 15 where an electrical connector attachment is made in the space between the inboard chute panel and the outboard chute panel.

* * * * *